United States Patent

Schaeffler

[15] 3,669,954

[45] June 13, 1972

[54] PROCESS FOR PRODUCING SEMIPERMEABLE MEMBRANES

[72] Inventor: Otto S. Schaeffler, Arcadia, Calif.

[73] Assignee: The United States of America as represented by the Secretary of the Interior

[22] Filed: May 4, 1970

[21] Appl. No.: 34,578

[52] U.S. Cl. ............................260/230 R, 210/23, 210/500, 260/17, 264/49
[51] Int. Cl. ....................C08b 3/22, B01d 13/00, B29h 7/20
[58] Field of Search........................210/22, 23, 321, 500, 24; 106/196; 264/41, 49; 260/230 R

[56] References Cited

UNITED STATES PATENTS

| | | | |
|---|---|---|---|
| 3,083,118 | 3/1963 | Bridgeford | 210/24 X |
| 3,285,765 | 11/1966 | Cannon | 106/196 X |
| 3,585,126 | 6/1971 | Cannon et al | 210/23 |

OTHER PUBLICATIONS

U.S. Office of Saline Water, Saline Water Conversion Report 1968, 6-5-1969, p. 111

*Primary Examiner*—Charles N. Hart
*Attorney*—Ernest S. Cohen and William S. Brown

[57] ABSTRACT

Semipermeable membranes having improved reverse osmosis properties are prepared by crosslinking cellulose acetate methacrylate membranes in an aqueous persulfate-bisulfite redox system. The resulting membranes exhibit superior long-term reverse osmosis properties and find particular utility in desalination of water.

3 Claims, No Drawings

PROCESS FOR PRODUCING SEMIPERMEABLE MEMBRANES

Reverse osmosis has attracted considerable interest in the field of purification of saline water. In this process, a pressure in excess of the osmotic pressure of the saline water feed solution is applied to the solution separated from purified water by a semipermeable membrane. Pure water is thereby caused to diffuse through the membrane, while the salt molecules or other impurities are retained by the membrane.

Efficiency of the reverse osmosis process depends to a large extent on the nature of the semipermeable membrane and numerous types of membranes and methods of preparing them have been described in the prior art, e.g., in U.S. Pat. Nos. 3,344,214; 3,412,184 and 3,439,074. These membranes are commonly cast from a solution comprising the membrane material and an organic solvent, with or without additional solution components such as water, swelling agents, etc. The membranes may be employed in the reverse osmosis process in the form of a free film or a film deposited on a porous support material.

It has now been found, in accordance with the present invention, that a preformed cellulose acetate methacrylate (CAM) membrane may be crosslinked to a high degree of acetone insolubility, e.g., about 50 to 95 percent insolubility, using a persulfate-bisulfite redox system in water and that the resulting membranes exhibit superior reverse osmosis properties. The product membranes are particularly outstanding in long-term reverse osmosis because of their superior flux stability. This superiority is evidenced by decreased flux decline slopes as compared to those of uncrosslinked membranes. Other means of crosslinking have previously been used in preparation of membranes, e.g., a redox system composed of ferrous sulfate and hydrogen peroxide and ultraviolet irradiation. However, these methods have the disadvantages of deposition of ferric oxide on the membrane in the former and dependence on exposure time and absorption in the latter. The method of the invention, on the other hand, is highly advantageous since it can be performed in aqueous media, is rapid and is independent of the physical properties of the membrane.

Esters and mixed esters of cellulose are conventionally prepared by reaction of cellulose with an acid or acid chloride. Cellulose acetate is generally prepared by reaction of cellulose with acetic acid in the presence of chloroacetic anhydride. Preparation of the methacrylate is conveniently accomplished by reaction of cellulose acetate with methacrylyl chloride in solution in a solvent such as methylene chloride, preferably in the presence of pyridine. Other suitable solvents include acetone, ethylene chloride, dioxane and dimethylacetamide.

The average degree of substitution (ds) of the acetyl and methacrylyl groups in the CAM precursor are important in determining the reverse osmosis properties of the membrane of the invention. Optimum ds values may, however, vary considerably depending on the type of saline water treated, e.g., sea water or brackish water, desired flux rate and percent of salt rejection, etc., and are best determined empirically. Generally, acetyl ds values of about 2.0 to 2.5 and methacrylyl ds values of about 0.1 to 0.4 are satisfactory, with preferred ranges being about 2.1 to 2.4 for acetyl and 0.2 to 0.4 for methacrylyl.

The CAM membranes are formed by casting from a solution comprising the ester, i.e., the cellulose acetate methacrylate, and an organic solvent such as acetone, dioxane or pyridine. It may also be desirable to include a swelling agent such as magnesium perchlorate, maleic acid, formamide, acetamide, etc. to provide sufficient porosity in the substrate portions of the film. In addition, it is generally desirable to include water in an amount sufficient to achieve the desired membrane porosity. Suitable proportions of these ingredients will usually be approximately as follows: ester, about 10 to 25 percent; solvent, about 30 to 60 percent; swelling agent, about 5 to 15 percent and water, about 5 to 15 percent. A particularly effective casting solution has been found to consist of about 10 parts of ester, about 35 parts of acetone, about 14 parts of maleic acid and about 10 parts of water.

The castings are preferably made at low temperature, i.e., at about $-10°$ to $24°C$, preferably at about $-10°C$, and in wet thicknesses of about 10 to 20 mils, preferably about 10 mils. They are then preferably gelled immediately in ice water for a period of about 2 to 8 minutes and subsequently heat-treated in water for a period of about 3 to 5 minutes, preferably about 3 minutes, at a temperature of about $50°$ to $90°C$, preferably about $80°$ to $86°C$.

The thus-prepared CAM membranes are then crosslinked by treatment with an aqueous persulfate-bisulfite redox solution. This treatment is usually most conveniently effected by submersion of the membrane in the redox solution for a period of about 3 to 15 minutes, preferably about 2 to 4 minutes. Temperature of the redox solution should be about $80°$ to $95°C$, preferably about $90°C$.

The persulfate component of the redox solution is preferably the potassium salt, i.e., $K_2S_2O_8$; however, other salts such as ammonium peroxydisulfate may also be used. The bisulfite component is preferably sodium bisulfite, i.e., $NaHSO_3$, with other salts such as potassium hydrogen sulfite also being suitable. Concentration of the persulfate is suitably from about 0.02 to 0.10 molar, while concentration of bisulfite may be about 0.02 to 0.10 molar, preferably about 0.04 to 0.07 molar. In general, the extent of crosslinking is dependent on both the catalyst concentration and the temperature, longer exposure periods being required at lower catalyst concentrations or lower temperature. The crosslinked membranes, after removal from the redox solution, are ready for use in conventional reverse osmosis apparatus.

The following example will serve to more particularly illustrate the invention.

EXAMPLE

Membranes were prepared from a CAM polymer having an acetyl ds of 2.09 and a methacrylyl ds of 0.29 using a casting solution containing 35 parts of acetone, 10 parts of polymer, 10 parts of water and 14 parts of maleic acid. Castings of 10 mils wet thickness were made at $-10°C$, gelled immediately in ice water and heat treated in water for 3 minutes at $80°$, $83°$ and $86°C$. Several test circles from each of the membranes were crosslinked in a solution of $3.7 \times 10^{-2}$ M potassium persulfate and $3.8 \times 10^{-2}$ M sodium bisulfite at $90°C$. After this treatment approximately 95 percent by weight of the membranes was insoluble in acetone indicating highly effective crosslinking.

Three circles from each of the uncrosslinked ($80°$, $83°$ and $86°$) and crosslinked ($80°X$, $83°X$ and $86°X$) membranes were tested for 200 hours with 1 percent sodium chloride feed at 800 psi. The data are summarized below.

| Membrane | Flux decline slope, m | Initial flux, gfd | Salt rejection, % | |
|---|---|---|---|---|
| | | | Initial | Final |
| 80° | −0.042 ± 0.008 | 50 | 69.2 | 86.5 |
| 80°X | −0.022 ± 0.009 | 67 | 68.6 | 76.7 |
| 83° | −0.037 ± 0.005 | 35 | 85.1 | 90.3 |
| 83°X | −0.019 ± 0.003 | 52 | 86.0 | 82.8 |
| 86° | −0.051 ± 0.008 | 39 | 82.9 | 91.4 |
| 86°X | −0.013 ± 0.002 | 41 | 89.4 | 89.8 |

As is apparent from the data, the flux of the crosslinked membranes is greatly stabilized over their uncrosslinked counterparts. The 86°X membrane with a flux slope of −0.013 and a 1-hour flux of 41 gfd would be expected to have a flux of 37 gfd after 1 year of operation.

What is claimed is:

1. A method for preparation of a semipermeable membrane comprising crosslinking a cellulose acetate methacrylate membrane by treatment of said membrane with a potassium persulfate-sodium bisulfite redox system in aqueous solution.

2. The method of claim 1 in which the cellulose acetate methacrylate membrane is heat treated prior to crosslinking.

3. The method of claim 1 in which the cellulose acetate methacrylate has an average degree of acetate substitution of about 2.0 to 2.5 and an average degree of methacrylate substitution of about 0.1 to 0.4.

* * * * *